July 31, 1934.  R. DE FILIPPIS  1,968,030
AUTOMATIC GEARLESS TRANSMISSION
Filed June 11, 1929   2 Sheets-Sheet 1
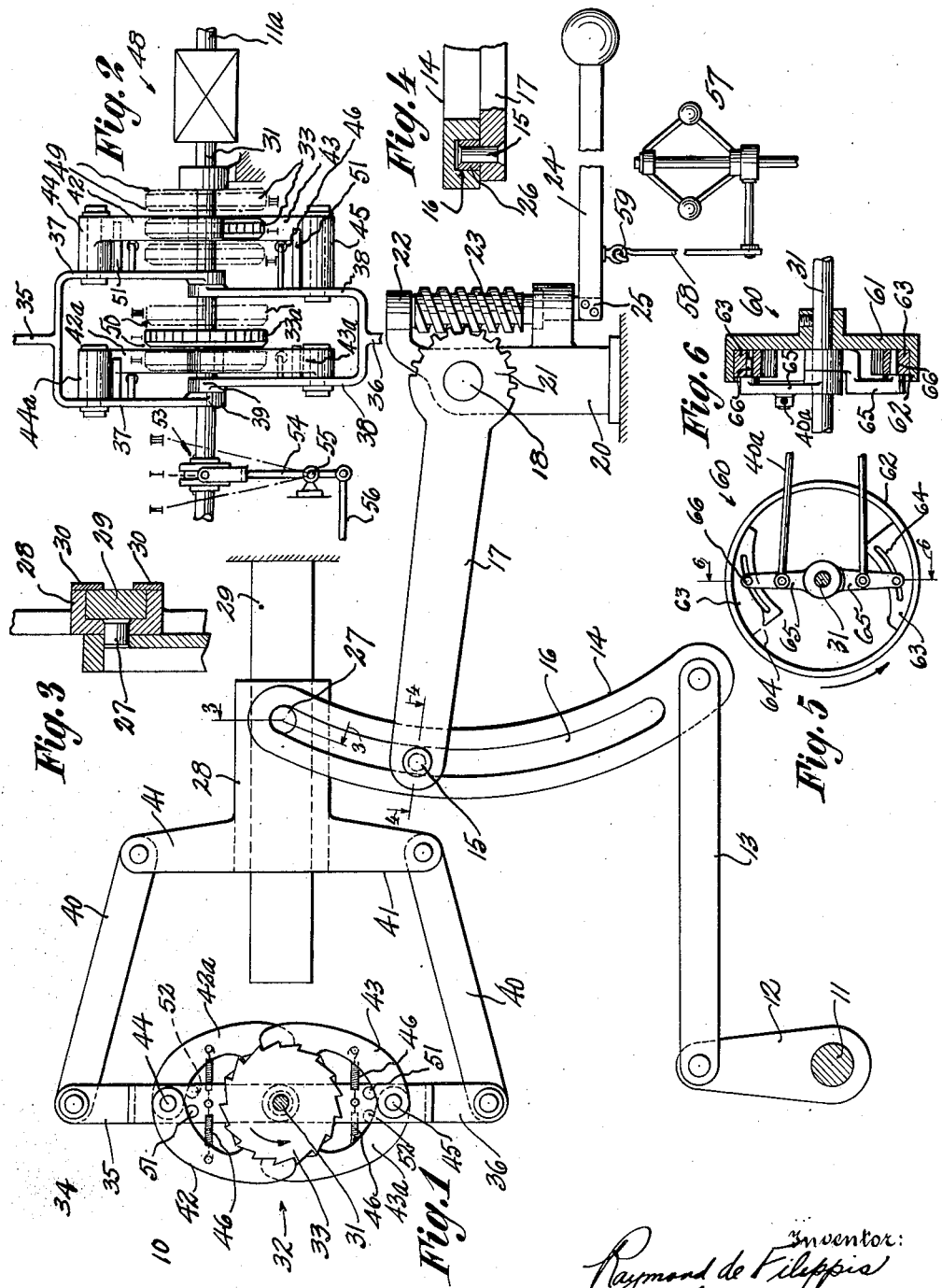

July 31, 1934.    R. DE FILIPPIS    1,968,030
AUTOMATIC GEARLESS TRANSMISSION
Filed June 11, 1929    2 Sheets-Sheet 2

INVENTOR
Raymond de Filippis
BY
Beeler & Schumacher
ATTORNEYS

Patented July 31, 1934

1,968,030

UNITED STATES PATENT OFFICE 1,968,030

AUTOMATIC GEARLESS TRANSMISSION

Raymond de Filippis, Brooklyn, N. Y.

Application June 11, 1929, Serial No. 369,966

36 Claims. (Cl. 74—54)

This invention relates to power transmissions and has among its objects the provision of an improved simplified device of the character described which while adapted for general application, shall be of particular advantage in automobiles.

Another object of the invention is the provision of an improved transmission in which gears are wholly eliminated.

Another object of the invention is the provision of a device of the class alluded to having a novel clutch or engaging element which can be of a positive type, and means having improved association therewith for obtaining a continuous graduation in speed over a considerable range.

Another object of the invention is to provide an improved device that permits the automobile automatically to coast without manipulation of any control.

Another object of the invention is to furnish an improved device of the type mentioned which is simple and compact in construction, and is capable of reversing, and permitting the engine to be direct connected to the driving shaft, which features can be used in any desired combination, and are preferably arranged for progressive operation.

A further object of the invention is to construct a device of the nature set forth having few and simple but rugged parts, and which is easy to make, reliable and efficient in operation, and adapted for quantity production.

Other objects and advantages of the invention will become apparent as the specification proceeds.

With the aforesaid objects in view, the invention consists in the novel combinations and arrangements of parts hereinafter described in their preferred embodiments, pointed out in the subjoined claims, and illustrated on the annexed drawings, wherein like parts are designated by the same reference characters throughout the several views.

In the drawings:

Figure 1 is a diagrammatic view of a device embodying the invention.

Fig. 2 is a fragmentary view in end elevation of the same.

Figure 7:
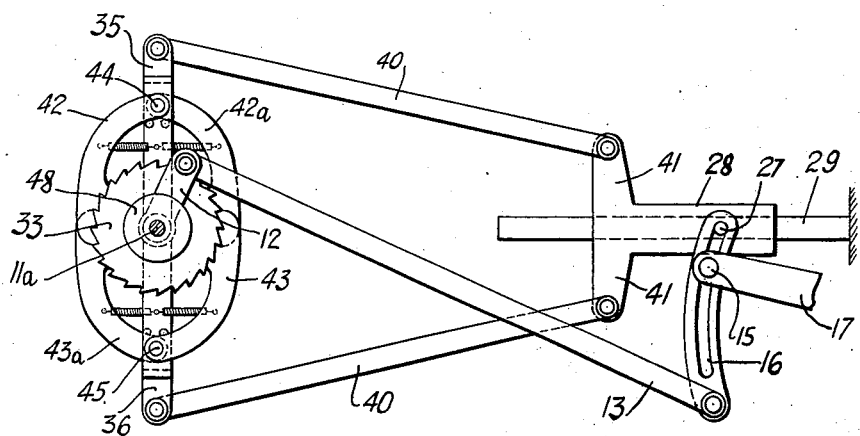

Figs. 3 and 4 are enlarged sectional views taken on lines 3—3 and 4—4 respectively of Fig. 1.

Fig. 5 is a view in side elevation of a modified clutch arrangement.

Fig. 6 is a vertical sectional view taken on line 6—6 of Fig. 5.

Fig. 7 is a diagrammatic fragmentary view similar to Fig. 1, but showing certain shafts in alinement.

Generally described, the invention provides a power transmission that operates without the use of gears and by which any desired speed reduction can be obtained over a suitable range. The engine crankshaft transmits power to a reciprocating member, which operates an engagement or clutch device in an oscillatory manner to impart motion to a driven shaft. By the use of a plurality of clutch devices, operating in alternation, a continuous rotation of the shaft results. The clutch device may consist of a member fixed on the driven shaft. Pivotally mounted on the shaft are a plurality of radial arms that extend in opposite directions from the said shaft. Each arm includes an engagement member for gripping a portion of the fixed clutch member. Since the arms are connected to the reciprocating member, they are caused to pivot alternately toward and away from each other. When moving in one direction one engagement member functions, and when moving in the opposite direction the other grips and drives the fixed clutch member, and hence the shaft. A substantially duplicate arrangement permits the shaft to be driven in reverse. From neutral, the shaft may be actuated for low speed or reverse or the shaft may be direct connected to the engine for high speed, and progressive operation is thus obtained, since the said shaft may be driven normally in the forward direction, then in reverse, and finally direct connected, all by a movement of a single operating member. To obtain a desired range of speed, the extent of the reciprocation may be varied, as, for instance, by the employment of a lever having arms of a variable ratio. By making the clutch large a very great speed reduction can be obtained. This invention is of the overrunning type that permits coasting and saving of fuel. No manipulation of the control is necessary, but the coasting occurs automatically when traveling on a down grade.

Referring in detail to the drawings, 10 denotes a device embodying the invention. The same includes a transmission which can be used for various purposes in the transmission of power. As one possible embodiment of the invention, I have shown the same adapted for use in automobiles. The driving shaft 11 turns a crank 12, which connects by means of a link 13 with a lever 14. The latter has a pivot 15 which is movable along a recess 16 of the lever. Carrying the said pivot is an arm 17 that is pivotally mounted at 18 on a stationary bracket 20.

To move the pivot 15 along the recess 16, the arm 17 is formed with any suitable actuating means, which may include a gear segment 21. Mounted on the bracket in the bearings 22 thereof, is a vertical screw 23, which may have a multiple thread, the teeth of which mesh with those of the gear segment 21. The said screw is turned in any desired manner, as, for example, by an arm 24 that is fixed to the lower end of the screw at 25. By turning the screw, the arm 17 is caused to move up or down thus changing the location of the pivot 15. The pivot 15 may have a roller 26 to reduce friction in the recess.

Connected to the lever 14 at 27 is a reciprocating member 28 that is slidingly mounted on a stationary guide bar 29. The reciprocating member is of U-form in cross section to receive the bar 29, and plates 30 serve to retain the member slidably on the bar. The pivot 27 terminates in an end of the recess 16, so that the pivot 15 may move into alined relation therewith.

The reciprocating movement of the member 28 is caused by the lever 14 which oscillates back and forth on its pivot 15, as a result of the rotation of the crank 12. By moving the pivot 15 along the lever, the length of the reciprocations can be varied. While a specific lever arrangement has been shown, the same can be changed, and the ratio of the length of the arms of the lever controlled by various modified constructions that will be readily apparent to those skilled in the art.

Extending in any suitable relation to the driving shaft 11, and preferably in parallelism thereto, is a driven shaft 31. Mounted upon the latter are clutch means 32 which may be embodied in various modifications, certain forms of which are shown herein to illustrate the invention. The clutch means 32 may include one or more clutch members 33 that are fixed to the driven shaft. Coacting between the clutch means and the reciprocating member 28 are means 34 that are actuated by the said member and move back and forth therewith to impart a series of impulses to a clutch member 33 and cause a continuous rotation of the driven shaft, as will now be described.

One form of a clutch member 33 may consist of a circular member having a rough or toothed surface, that may be in the nature of a ratchet wheel. Pivotally mounted on the shaft 31 are yokes 35, 36, each having a pair of arms 37, 38 respectively, terminating in bearings 39 that receive the shaft 31. Connecting the said yokes to the reciprocating member, are links 40, which are movably joined to the said member at the lugs 41 thereof. Since the yokes 35, 36 are radial with respect to the driven shaft, and extend in diametrically opposite relation therefrom, the reciprocation of member 28 causes a simultaneous movement of both of the yokes, with one of them moving clockwise and the other counterclockwise. Due to the proportions of the parts, this movement of the yokes occurs through an equal angle for both of them.

Coacting with the clutch member 33 are a pair of engagement members or pawls 42, 43, which are mounted at 44, 45 on the yokes 35, 36 respectively, each being adjacent an arm of its yoke. These pawls extend in opposite offset relation to each other to engage opposite portions of the clutch member 33. Tension coil springs 46 connected to the pawls and to the yokes, automatically retain the pawls in engagement with the clutch member 33.

In operation, when member 28 moves toward the left, the pawl 42 turns the clutch member 33. But the movement of yoke 36 being clockwise, the pawl 43 merely idles along the clutch member. When the member 28 moves toward the right, the latter pawl turns the clutch member in the same direction, while the pawl 42 idles along the same. Thus the rotation of the shaft 31 occurs on the movement of the member 28 in each direction during its reciprocation. The rotation of the driven shaft is therefore continuous. Any suitable flywheel may cooperate to render the operation of the driven shaft entirely smooth and uniform.

To permit the driven shaft 31 to be reversed, a duplicate clutch member 33a is fixed on the same, but with the teeth thereof in an opposite direction relative to those of the member 33. Similarly, pawls 42a and 43a coact to impart the requisite rotational force to the reversing clutch member 33a. These pawls are mounted adjacent to the other arms of the yokes 35, 36 at 44a.

It is noted that the clutch member and pawls for driving the shaft 31 in the normal direction are positioned externally of the yokes, and to the right thereof, as shown in Fig. 2, while those for reversing are within the yokes. This arrangement, however, is susceptible of various modifications.

The driven shaft 31 is movable lengthwise, and the clutch members 33 and 33a are so related to their respective pawls, that when one of the clutch members is in engagement, the other is out of engagement.

When driving forward at the normal rates of speeds, and when coasting, the transmission is as shown in Fig. 2 and specifically in position I. The coasting can occur automatically due to the direction of the teeth with respect to the pawls, when shaft 31 runs ahead of the engine. No manipulation or adjustment of the controls is necessary. When the coasting ceases, the engine again drives the automobile automatically.

To reverse, the shaft 31 is moved to the left, the position of the clutches being indicated by II. In this position clutch 33a is in engagement, but clutch 33 is out of engagement with their respective pawls.

For direct connection, the driven shaft 31 is moved toward the right, with parts in position III, in which the driven shaft is connected to a driving shaft 11a by any suitable clutch 48. Both the clutches 33 and 33a are now out of engagement with their pawls, and are positioned at the right of them.

To facilitate the engagement and disengagement of the clutch members 33 and 33a with their pawls as above described, the former has its teeth beveled off as shown at 49, and the latter as shown at 50. To hold the several pawls in position for easy engagement by the clutch members, stops 51 and 52 are provided for the respective pawls on the yokes 35, 36, to limit the movement of the pawls under actuation of the springs 46.

The lengthwise movement of the shaft 31 may be obtained in various ways. Thus a collar 53 may be provided therein, which is engaged by a lever 54, pivotally mounted at 55, and operated by a rod 56. The three progressive positions of the shaft for driving in forward, then in reverse, and finally in direct, are thus easily obtained by a progressive movement of the actuating rod 56. The latter may be manipulated manually, or in any other desired manner.

The invention can automatically control the speed of the driven shaft, for which purpose, a governor 57 is provided. The same is connected to an arm 24 by a link 58 having detachable hook connection with the said arm at 59. By disconnecting the link the speed of the driven shaft is controlled manually only. However, when connected, the governor which is located either to the front or the rear of the arm 24, turns the latter, and hence the screw 23, thus varying the length of the reciprocation of member 28, and changing the speed of the driven shaft accordingly.

The angle of oscillation of the yokes 35, 36 may be considerable, and may depend on the proportions of the various parts and the specific construction of the clutch members. The maximum angle of movement is obtained when the pivot 15 is at the lower end of the lever 14. If it is desired that the driven shaft shall be idle, while the driving shaft rotates, the pivot 15 is moved into alinement with pivot 27. In this position there will be no reciprocation of the member 28.

In Figs. 5 and 6 is shown a modification of the clutch device, the same including a member 60 fixed on the driven shaft 31. This member 60 includes a disc 61 having an annular flange 62. One or more shoes 63 coact with the said flange. Formed in the shoes 63 are recesses or slots 64 that extend at an angle to the flange, so that the arms 65, that are pivotally mounted on the shaft, and having pins 66 extending into the slots, may by moving in clockwise and counterclockwise direction, as the case may be, press the shoes frictionally into engagement with the annular flange and impart impulses to the clutch member to turn the same. The arms 65 are oscillated by links 40a that correspond to links 40 hereinbefore described. When the upper arm moves toward the right, its pin 66 moves along the slot and permits the shoe to move away from the annular flange in a direction toward the center of the shaft 31. Simultaneously, the lower arm 65 moves toward the right and actuates the corresponding shoe into frictional engagement with the flange 62, and also causes the clutch to rotate. The modification of Figs. 5 and 6 is intended primarily to illustrate a toothless clutch which can be used in the invention.

Considering both forms of clutches, it will be appreciated that very small teeth may be provided on a clutch member of large diameter, thus permitting a very high speed reduction. In fact the only limit, theoretically, is the size of the clutch member and the strength of the materials used. The area of the engaging surfaces may be large, since the pawls or shoes can be made of considerable width as well as length. Operation of the device may occur in a suitable oil bath so that a smooth and quiet operation is obtained.

I claim:

1. An automobile transmission including a rotary driving shaft, a lever, means connected to the lever and driving shaft for oscillating the lever, a pivoted member, said lever being pivotally mounted on said member for varying the relative length of the lever arms by moving the pivoted member, a reciprocating member actuated by the lever, a driven shaft, a clutch means thereon, a plurality of oppositely positioned radial arms pivoted on the axis of the driven shaft, links connecting the arms individually with the reciprocating member for oscillation of the arms, engagement elements pivotally mounted on the arms and coacting with said clutch means so as to turn the clutch means in alternation in synchronism with the reciprocation of the reciprocating means.

2. An automobile transmission including a rotary drive shaft, a lever, means for oscillating the lever as a result of the rotation of the drive shaft, means for varying the relative lengths of the lever arms, a driven shaft, clutch means thereon, a plurality of oppositely positioned arms pivotally mounted on the axis of the driven shaft, reciprocating means actuated by the lever for producing a variable stroke, means connecting the reciprocating means and said arms for oscillating the latter, and engagement members for the clutch means, said engagement members being individually connected to said arms and coacting with the clutch means to turn the latter in alternation with the strokes of the reciprocating means, whereby a continuous rotation of the driven shaft is obtained without the use of gears.

3. A transmission including a driven shaft, clutch means thereon, reciprocating means, means actuated by the latter for imparting a torque to the clutch for turning the driven shaft in a constant direction, on each stroke of the reciprocating member, a rotary driving shaft, a lever, means connecting the driving shaft and the lever at one end thereof for oscillating the lever, the other end of the lever being pivotally connected to the reciprocating means, and pivoted means mounting the lever, said lever being pivotally connected to the pivoted means at a point intermediate of the ends of the lever, said lever being curved along an arc concentric with the pivot of the pivoted means, whereby a variable speed of the driven shaft can be produced without the employment of gears.

4. A transmission including a rotary drive shaft, a lever, means connecting the drive shaft and the lever for oscillation of the latter, a reciprocating means actuated by the lever, a driven shaft, clutch means thereon, means connecting the reciprocating means with the clutch means for imparting an impulse to the latter in the same direction on each stroke of the reciprocation, movable pivot means for the lever for varying the lever arm ratio, means including a worm gear for adjusting the position of the pivot means and holding the same in adjusted position, and a speed governor connected to the worm gear to turn the same for varying said ratio and hence the length of the reciprocation and the speed of the driven shaft.

5. A transmission including a rotary drive shaft, a lever, means connecting the drive shaft and the lever for oscillation of the latter, a reciprocating means actuated by the lever, a driven shaft, clutch means thereon, means connecting the reciprocating means with the clutch means for imparting an impulse to the latter in the same direction on each stroke of the reciprocation, movable pivot means for the lever for varying the lever arm ratio, a pivoted member for adjusting the position of the pivot means, manually operated means for controlling the pivoted member, and a speed governor connected to the manually operated means for automatically regulating the speed of the driven shaft.

6. An automobile transmission including a driving shaft, a driven shaft slidable relatively to the driving shaft in alinement therewith, means for connecting said shafts for forward driving with the driven shaft at a different speed than the driving shaft, a second means for connecting the shaft for driving in reverse, a third means for direct connecting said shafts, and a single means connected to the driven shaft for causing the sliding movement thereof for operation by any of the first, second, or third means, the first means including clutch wheels secured on the driven shaft for constant rotation therewith, a plurality of opposed arms for gripping and driving the clutch wheels, said arms being mounted for oscillation about the axis of the driven shaft and being otherwise stationary, and means for oscillating said arms.

7. An automobile transmission including a driven shaft, a rotary driving shaft, means reciprocated by the driving shaft, a second means operated by the reciprocating means to cause constant rotation of the driven shaft in the same direction, the second means including means for forward driving, and means for driving in reverse, a clutch adapted to directly connect the driving and driven shafts, the means for forward and reverse driving being mounted on the driven shaft, the said clutch being in alinement with the driven shaft, the latter being longitudinally movable and coacting with said clutch, whereby the forward and reverse drive means and said clutch are individually operative in different positions of the driven shaft.

8. A transmission including a driving shaft, a driven shaft, adjustable means including a lever having a movable pivot for causing the driving shaft to operate the driven shaft at a varying rate of speed, said adustable means including constantly rotating elements on the driven shaft and oscillating members for actuating said elements, said elements being actuated by said lever for forward driving and for reverse driving, a clutch for directly connecting the said shafts, and a single member independent of said lever for causing the said elements and the clutch to operate for progressive driving in reverse, forward, or direct connection.

9. A transmission including a driving shaft, means reciprocated thereby, said means having a variable stroke, a driven shaft, means including a clutch operated by the reciprocating means for rotating the driven shaft continuously in the same direction, and a second clutch for direct connecting the driving and driven shafts, one of said shafts being movable in a single elongated path for causing the second mentioned means or the second clutch to operate.

10. An automobile transmission including a driving shaft, means reciprocated thereby, said means having a variable stroke, actuated means including a driven shaft, ratchet wheel means on the driven shaft, pawls operative in alternation for imparting a continuous turning movement to the ratchet wheel means to rotate the driven shaft at variable speeds in the same direction, and a clutch for direct connecting the driving and driven shafts, the actuated means being movable along the axis of the driven shaft for causing the pawls or the clutch to operate, whereby a reduced or high speed of the driven shaft are obtainable without the use of gears.

11. An automobile transmission including a driving shaft, a driven shaft, a member reciprocated by the driving shaft, a plurality of ratchet wheels on the driven shaft, arms pivotally mounted on the driven shaft and extending in radial angularly spaced relation, pawls on said arms, said pawls coacting with the ratchet wheels so that the pawls actuate the ratchet wheels in alternation on the succession strokes of the reciprocating member, the latter lying in the plane of the driven shaft and having oppositely extending projecting portions, and links connecting the arms with the ends of said portions, the latter being of such length that said links form only a small angle with said plane for an approximately parallel transmission of power to said arms.

12. An automobile transmission including a driving shaft, a member reciprocated thereby, a driven shaft, a plurality of ratchet wheels thereon, pawls for the ratchet wheels, means connecting the pawls and the reciprocating member to oscillate the pawls, one of the ratchet wheels being arranged for forward and another for reverse driving of the driven shaft, said ratchet wheels being movable axially of the driven shaft so that one of the ratchet wheels is in operative relation to its pawl while the other ratchet wheel is in inoperative relation relative to its pawl, automatic means actuating the pawls into engagement with the ratchet wheels, and stops for limiting the movement of the pawls under actuation of the automatic means for engagement by the pawls of their respective ratchet wheels.

13. An automobile transmission including a rotary driving shaft, a reciprocating means actuated thereby, means for varying the length of the stroke of the reciprocating means, a driven shaft, clutch means on the driven shaft adapted to overrun when the speed of the automobile exceeds the speed of the engine thereof, means connecting the reciprocating means and the clutch means and coacting with the latter for driving the driven shaft in forward or reverse direction, and means for rendering the clutch means inoperative and direct connecting the driving and driven shafts.

14. An automobile transmission including a rotary drive shaft, a single reciprocating means actuated thereby, a driven shaft alined with the drive shaft, a plurality of overrunning clutch means on the driven shaft for direct and reverse driving, each of said clutch means including a plurality of clutch elements one of which is connected to the driven shaft in alinement therewith and the other to the reciprocating means for operation of the clutch means and driving of the driven shaft, shifting means for moving said clutch elements apart in one or an opposite direction parallelly to the driven shaft for direct or reverse driving, and said shifting means being adapted to move the elements of both clutch means apart into inoperative position, and means coacting with the shifting means for connecting the driving and driven shafts for rotation of the latter in the inoperative position of the clutch means.

15. An automobile transmission including a driving shaft, a driven shaft, a variable speed drive connecting said shafts, said drive including a plurality of spaced clutch wheels mounted on the driven shaft for forward and reverse driving thereof, a yoke mounted on the driven shaft, means for oscillating said yoke, and separate arms individually engageable with the clutch wheels for rotating the driven shaft in the forward or reverse direction, said arms being mounted on legs of the yoke for simultaneous actuation thereof, said yoke being relatively movable longitudinally of the driven shaft and the arms and clutch wheels being so related that one or the other clutch wheel is rotated according to the relative movement of the yoke.

16. An automobile transmission including a driving shaft, a driven shaft, the latter having clutch means, a plurality of substantially oppositely extending arms journaled on the axis of the driven shaft for oscillation in opposite directions, said arms coacting with the clutch means so as to actuate the latter in alternation, an actuating means movable back and forth along a plane at right angles to a plane defined by the driven shaft, said actuating means having rigid connections equally spaced in opposite directions with respect to the driven shaft, link means of substantially equal length separately connecting the arms with said connections to oscillate the arms, said connections being sufficiently extended so that the links make a relatively small angle with each other, and means for moving the actuating means with a variable throw, said last mentioned means including a rotary member connected to the driving shaft and lever means having an adjustable pivotal axis.

17. An automobile transmission including a driving shaft, a driven shaft, drive means interconnecting said shafts for driving the driven shaft in forward or reverse direction from the driving shaft, said drive means including clutch elements on the driven shaft, oscillating elements for individually actuating the clutch elements, means including an oscillatory lever having variable arms for actuating the oscillating elements, said drive means including a single means for causing the oscillating elements to actuate either of said clutch elements without affecting the lever arms.

18. An automobile transmission including a driving shaft, actuator means oscillated thereby, means reciprocated by the actuator means, said actuator means being adjustable to vary the length of the reciprocations, a driven shaft, clutch means operated by the reciprocating means for rotating the driven shaft continuously in one direction, a second clutch means for direct connecting the driving and driven shafts, the actuator means having one position of adjustment whereby said actuator means is inoperative for causing reciprocation of the reciprocating means, and means for adjusting the actuator means including a plurality of elements, one of said elements consisting of a worm having a fixed axis of rotation and permanently interengaged with the other element, the latter element being movable about a fixed axis extending at an angle to the axis of the worm.

19. An automobile transmission including a driving shaft, means having a variable stroke reciprocated thereby, a driven shaft, clutch means operated by the reciprocating means for rotating the driven shaft continuously in the same direction, manually operated means for adjusting the variable stroke of the first mentioned means, a speed governor coacting with the manually operated means for controlling the variable stroke of the first mentioned means, and toothed means interconnecting the speed governor with the first mentioned means for causing a gradual positive control thereof, said toothed means including means for continuous positive interconnection with the first mentioned means.

20. An automobile transmission including driving and driven shafts, means interengaging the driving and driven shafts so as to cause the driving shaft to rotate the driven shaft at variable speeds different than the speed of the driving shaft, means for releasably direct connecting the driving and driven shafts, the interengaging means being movable into inoperative position when the shafts are direct connected, and a speed governor connected to the interengaging means and detachable therefrom upon direct connecting the shafts.

21. An automobile transmission including a driving shaft, actuator means oscillated thereby, means reciprocated by the actuator means, said actuator means being adjustable to vary the length of the reciprocations, a driven shaft, clutch means operated by the reciprocating means for rotating the driven shaft continuously in the same direction, means including a speed governor for controlling the adjustment of the actuator means, a second clutch means for direct connecting the driving and driven shafts, and means independent of the controlling means for operating the second clutch means.

22. An automobile transmission including a driving shaft, a driven shaft, the former having overrunning clutch means, a plurality of substantially oppositely extending arms journaled on the axis of the driven shaft of oscillation in opposite directions, said arms coacting with the clutch means so as to actuate the latter in alternation, an actuating means movable back and forth along a plane at right angles to a plane defined by the driven shaft, said actuating means having rigid connections equally spaced in opposite directions with respect to the driven shaft, link means of substantially equal length separately connecting the arms with said connections to oscillate the arms, means for moving the actuating means with a variable throw, said last mentioned means including a rotary member connected to the driving shaft and an adjustable lever connecting the rotary member with the actuating means, and means for releasably direct connecting said driving and driven shafts.

23. An automobile transmission including a driving shaft, a driven shaft, overrunning drive means whereby the driving shaft causes rotation of the driven shaft, and means for direct connecting the driving and driven shafts, the driven shaft coacting with the overrunning drive means and the direct connecting means and being longitudinally movable into different positions for actuation of the driven shaft by one or the other of said means, the overrunning drive means consisting of clutches having parts movable out of assembly relation with each other upon direct connecting said shafts.

24. An automobile transmission including a driving shaft, a driven shaft, overrunning means releasably interconnecting said shafts for causing rotation of the driven shaft in one direction, means for causing reverse rotation of the driven shaft by the driving shaft, means for direct connecting said shafts, the different means having elements mounted on the driven shaft, the latter being movable, and means for moving the driven shaft into different positions for actuation thereof by any one of said different means, each of the first and second mentioned means having parts successively movable out of assembly relation with each other upon direct connecting said shafts, and means for actuating said parts and the direct connecting means.

25. An automobile transmission including a driving shaft, a driven shaft slidable relatively to the driving shaft in alinement therewith, means for connecting said shafts for forward driving with the driven shaft at a different speed than the driving shaft, a second means for connecting the shafts for driving in reverse, a third means for direct connecting said shafts, and a single means connected to the driven shaft for causing the sliding movement thereof for operation by any of the first, second, or third means, the first means including clutch wheels secured on the driven shaft for contant rotation therewith, a plurality of opposed arms for gripping and driving the clutch wheels in overrunning relation therewith, said arms being mounted for oscillation about the axis of the driven shaft and being otherwise stationary, and means for oscillating said arms.

26. An automobile transmission including a driving shaft, a driven shaft, a variable overrunning transmission releasably interconnecting said shafts, means for releasably direct connecting said shafts, a speed governor for controlling the speed of the overrunning transmission, and toothed means interconnecting the speed governor with the overrunning transmission for causing a gradual positive control thereof, said toothed means including means for continuous positive interconnection with the overrunning transmission means.

27. An automobile transmission including a driving shaft, a driven shaft, means for releasably direct connecting said shafts so that the driven shaft is rotated at the speed of the driving shaft, transmission means for interconnecting said shafts so that the driven shaft is rotated at a speed less than that of the driving shaft, said transmission means being of overrunning character and including a toothed wheel on the driven shaft, and a pawl for actuating said toothed wheel for causing the rotation of the driven shaft, said pawl and wheel being disengageable from each other, and reciprocatory means for actuating the pawl, said reciprocatory means being movable into an inoperative position.

28. An automobile transmission including a driven shaft means, a driving shaft means, means movable parallel to the driven shaft, for releasably direct connecting the same, and transmission means for interconnecting the driving and driven shaft means, said transmission means including a toothed wheel on the driven shaft means, a pawl for actuating said wheel, and means for mounting and actuating said pawl, and said driven shaft means and pawl being movable relatively to each other parallelly to the driven shaft for controlling the direct connection and for moving said wheel into and out of engagement with said pawl, and means for causing said relative movement between the pawl and driven shaft.

29. An automobile transmission including a driven shaft, a driving shaft, said shafts being in alinement, means for releasably direct connecting said shafts, and transmission means for releasably interconnecting said shafts, said transmission means including a toothed wheel on the driven shaft, a pawl means having a plurality of teeth for simultaneously engaging the toothed wheel in driving relation, said driven shaft being longitudinally movable, and means for so moving the driven shaft to cause the same to control the direct connection and to move said toothed wheel into and out of engagement with the pawl means.

30. An automobile transmission including a driving shaft, a driven shaft, transmission means interconnecting the same, including overrunning clutch means for the driving shaft, a plurality of substantially oppositely extending arms journaled on the axis of the driven shaft for oscillation in opposite directions, said arms releasably coacting with the clutch means to actuate the latter intermittently in one direction, an actuating means movable back and forth along a plane at right angles to a plane defined by the driven shaft, said actuating means having portions projecting equally spaced in opposite directions with respect to the driven shaft, link means of substantially equal length separately connecting the arms with said portions to oscillate the arms, means for moving the actuating means with a variable throw, said last mentioned means including a rotary member connected to the driving shaft and an adjustable lever connecting the rotary member with the actuating means, releasable means for causing the driving shaft to rotate the driven shaft in a reverse direction, and means for releasably direct connecting said driving and driven shafts.

31. An automobile transmission including a driving shaft, a longitudinally slidable driven shaft, means for connecting said shafts for forward driving with the driven shaft at a different speed than the driving shaft, a second means for connecting the shafts for driving in reverse, a third means for direct connecting said shafts, and means connected to the driven shaft for causing the sliding movement thereof for operation of any of the first, second, or third means, the first means including clutch wheels secured on the driven shaft for constant rotation therewith, a plurality of opposed arms for gripping and driving the clutch wheels in overrunning relation therewith, said arms being mounted for oscillation about the axis of the driven shaft, and means for oscillating said arms.

32. An automobile transmission including a driving shaft, a driven shaft, a variable overrunning transmission releasably interconnecting said shafts, means for releasably direct connecting said shafts, a speed governor for adjusting the overrunning transmission to control the speed thereof, and positive power multiplying means interconnecting the speed governor and the overrunning transmission, said power multiplying means including a movable member connected to the transmission and means for controlling the operation of said member, the control means being sensitive to the governor and being adapted for positively moving the member for adjusting the speed of the transmission.

33. An automobile transmission including a driven shaft, a driving shaft, means for releasably direct connecting said shafts, and transmission means for releasably interconnecting said shafts, said transmission means including a toothed wheel on the driven shaft, an oscillating pawl for rotating said wheel to drive the driven shaft, said pawl having a plurality of teeth for simultaneously engaging the toothed wheel in driving relation, means for oscillating said pawl, said pawl and wheel being adapted for relative movement therebetween longitudinally of the driven shaft axis, and means for causing said relative movement or for causing the direct connection at will.

34. An automobile transmission including a driven shaft, a driving shaft, a drive means including actuator means oscillated by the driving shaft, means reciprocated by the actuator means, said actuator means being adjustable to vary the length of the reciprocations, whereby the speed of the driven shaft can be caused to approach that of the drive shaft, overrunning clutch means operated by the reciprocating means for rotating the driven shaft continuously in one direction, means for direct connecting said shafts, and a speed governor for controlling the actuator means and adapted to cause the speed of the driven shaft to approach that of the driving shaft.

35. An automobile transmission including a drive shaft, a member reciprocated thereby, a driven shaft, a ratchet wheel thereon, a pawl for the ratchet wheel, means connecting the pawl and the reciprocating member to oscillate the pawl, said pawl and ratchet wheel being movable relatively to each other longitudinally of the driven shaft for engagement and disengagement therebetween, automatic means for urging said pawl toward the teeth of the ratchet wheel, stop means for limiting the movement of the pawl under actuation of the automatic means in the disengaged position of the pawl and ratchet wheel, means for releasably direct connecting said shafts, and unitary means movable in the longitudinal direction of the driven shaft to control said direct connecting means and said movement between the pawl and ratchet wheel.

36. An automobile transmission including a drive shaft, a driven shaft, drive means interconnecting the same, including a ratchet wheel on the driven shaft, opposed oscillatory pawls for intermittently actuating the ratchet wheel to cause the driven shaft to rotate continuously in one direction, variable means connecting said pawls with the drive shaft for adjusting the oscillatory strokes of the pawls, means for releasably direct connecting said shafts, said pawls and ratchet wheel being movable toward each other and apart from each other in the direction of the axis of the ratchet wheel, means for moving the pawls and ratchet wheels and for causing the direct connecting means to operate upon separation of the pawls and ratchet wheel, and control means for the pawls for continuously urging the latter to move toward the axis of the ratchet wheel and for limiting the movement toward said axis so that the pawls are engageable with the ratchet wheel upon movement in said axial direction for engagement of the pawls and ratchet wheel.

RAYMOND DE FILIPPIS.